United States Patent
Cheluget et al.

(10) Patent No.: US 7,650,930 B2
(45) Date of Patent: *Jan. 26, 2010

(54) HIGH TEMPERATURE PROCESS FOR SOLUTION POLYMERIZATION

(75) Inventors: Eric Cheluget, Calgary (CA); Arun Sood, Calgary (CA); Rob VanAsseldonk, Airdrie (CA); Ryan McCabe, Red Deer (CA)

(73) Assignee: NOVA Chemical (International) S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/229,499

(22) Filed: Aug. 22, 2008

(65) Prior Publication Data
US 2009/0062495 A1 Mar. 5, 2009

(30) Foreign Application Priority Data
Aug. 27, 2007 (CA) .................................. 2598960

(51) Int. Cl.
F28G 13/00 (2006.01)
C08F 10/02 (2006.01)

(52) U.S. Cl. ......................... 165/95; 134/22.14; 165/96; 422/138; 526/334; 526/339; 526/340; 526/346; 526/347; 526/351; 526/352; 526/352.2; 528/484; 585/950

(58) Field of Classification Search ................. 422/138; 585/950; 528/484; 526/334, 339, 340, 346, 526/347, 351, 352, 352.2; 165/95, 96; 134/22.14
See application file for complete search history.

(56) References Cited

U.S. PATENT DOCUMENTS

| | | | |
|---|---|---|---|
| 3,553,156 A | 1/1971 | Anolick et al | |
| 3,726,843 A | 4/1973 | Anolick et al | |
| 4,105,609 A | 8/1978 | Machon et al. | |
| 4,379,882 A | 4/1983 | Miyata | |
| 4,444,922 A | 4/1984 | Gutowski et al. | |
| 4,496,698 A * | 1/1985 | Adriaans et al. | 526/64 |
| 4,547,473 A | 10/1985 | Hamilton et al. | |
| 4,676,301 A | 6/1987 | Sakamoto | |
| 4,731,438 A | 3/1988 | Bernier | |
| 4,773,357 A | 9/1988 | Scharton et al. | |
| 4,803,259 A | 2/1989 | Zboril et al. | |
| 4,857,633 A | 8/1989 | Irani et al. | |
| 4,917,176 A | 4/1990 | Shimada et al. | |
| 5,006,304 A | 4/1991 | Franklin et al. | |
| 5,132,380 A | 7/1992 | Stevens et al. | |
| 5,198,401 A | 3/1993 | Turner et al. | |

(Continued)

FOREIGN PATENT DOCUMENTS

CA 1142470 8/1983

(Continued)

Primary Examiner—Vasu Jagannathan
Assistant Examiner—Richard A Huhn
(74) Attorney, Agent, or Firm—Kenneth H Johnson (57) ABSTRACT

A process for the solution polymerization of olefins with improved on-stream time is provided. The solution polymerization process of the current invention comprises a method for the on-line removal of foulant material from one or more heat exchangers downstream of a polymerization reactor. Removal of foulant material is accomplished by deliberately applying a positive pressure differential across a heat exchanger. In the process of the current invention, reactor shut down is not required for the purpose of cleaning foulant material from a heat exchanger.

19 Claims, 5 Drawing Sheets

U.S. PATENT DOCUMENTS

| | | |
|---|---|---|
| 5,589,555 A | 12/1996 | Zboril et al. |
| 5,599,885 A | 2/1997 | Kawasaki et al. |
| 5,601,657 A | 2/1997 | Baum |
| 5,691,445 A | 11/1997 | Krupinski et al. |
| 5,708,133 A | 1/1998 | Higuchi et al. |
| 6,187,109 B1 | 2/2001 | Park et al. |
| 6,283,133 B1 | 9/2001 | Furuta et al. |
| 6,644,326 B2 | 11/2003 | Dorton et al. |
| 6,777,509 B2 | 8/2004 | Brown et al. |
| 6,881,800 B2 * | 4/2005 | Friedersdorf .................. 526/68 |
| 2008/0153996 A1 | 6/2008 | Friedersdorf et al. |

FOREIGN PATENT DOCUMENTS

| | | |
|---|---|---|
| EP | 0 110 456 A1 | 6/1984 |
| EP | 0 418 044 A2 | 3/1991 |
| WO | WO 98/02471 | 1/1998 |
| WO | WO 99/41294 | 8/1999 |

* cited by examiner

HIGH TEMPERATURE PROCESS FOR SOLUTION POLYMERIZATION

FIELD OF THE INVENTION

The current invention provides an improved process for solution polymerization. The solution polymerization process comprises a method for the on-line removal of foulant material from one or more heat exchangers.

BACKGROUND OF THE INVENTION

Solution polymerization processes are carried out at temperatures that are above the melting point of the product polymer. In a typical process, catalyst components, solvent, polymerizable monomers and hydrogen are fed under pressure to one or more stirred reactors. Catalyst components may be fed to the reactor as a solution or as a slurry and the temperature of the reactor is controlled by the rate of catalyst addition, the temperature of the catalyst feed stream and/or the use of heat transfer systems. Typical polymerizable monomers for solution phase polymerization processes include ethylene, styrene, propylene and various dienes.

For ethylene polymerization, reactor temperatures can range from about 130° C. to about 250° C. while pressures are generally in the range of from about 500 to about 4000 psi. Although catalyst residence times are generally short (e.g. minutes) due to the harsh reactor conditions, if desired, solution polymerization may be operated under a wide range of process conditions, which allow tailoring of the product polymer as well as rapid product swings.

In solution polymerization, product polymer is molten and remains dissolved in the solvent under reactor conditions, forming a polymer solution. After a selected hold-up time (i.e. catalyst residence time), the polymer solution leaves the reactor as an effluent stream and the polymerization reaction is quenched, typically with coordinating polar compounds, to prevent further polymerization. Once quenched, the polymer solution is fed to a flash devolatilization system for solvent removal. Flash devolatilization also removes un-reacted monomers from the polymer solution.

In a typical devolatilization process, the polymer solution (reactor effluent) is pre-heated in a heat exchanger and then passed into a chamber of reduced pressure. Boiling of solvent and un-reacted monomers occurs and the vapors are sent to a solvent and monomer recovery system and are recycled back to the reactor. Heating the polymer solution upstream of the devolatilization system increases the enthalpy of the product stream, providing high temperatures to the polymer melt after devolatilization. The high temperatures facilitate flow of the polymer melt by reducing its viscosity. The heat exchangers used are most commonly shell and tube type heat exchangers and can increase the temperature of the polymer solution to as high as about 280° C.

U.S. Pat. No. 4,547,473 describes a typical high temperature solution process for the homo- or co-polymerization of ethylene at temperatures in excess of 150° C. using a titanium based catalyst system. Solvent is removed using standard flash devolatilization as described in U.S. Pat. No. 5,708,133.

In PCT application, 98/02471 filed by Dow Chemicals, a solution polymerization process is described in which a two stage devolatilization system is used to remove solvent and un-reacted monomers from an EPDM (ethylene-propylene-diene monomer) polymer solution. In a preferred embodiment a dual reactor system is used in which the temperature of the second reactor is between 90° C. and 120° C. For flash devolatilization, the temperature of the reactor effluent is raised to between 210° C. and 250° C. by passage through a heat exchanger prior to entering the flash chamber, which is at lower pressure.

U.S. Pat. No. 5,691,445 assigned to Novacor Chemicals describes a polymer solution devolatilization process in which less than 150 ppm of residual volatiles is retained in the isolated polymer. In the process, the polymer solution leaves the reactor and travels through a pre-heat exchanger. The pre-heat exchanger heats the polymer solution to temperatures from about 200° C. to 270° C. to increase the vapor pressure of volatiles and to reduce the polymer solution viscosity. In a preferred embodiment, a super-critical fluid is added to the process at a point between the first and second devolatilization chambers to enhance polymer melt foaming.

Under certain conditions of temperature and pressure, the polymer solution can phase separate into two distinct liquid phases, one which is "lean" in dissolved polymer and one which is "rich" in dissolved polymer. Phase separation occurs at the lower critical solution temperature (LCST), also known as the "cloud point". Increasing the temperature, or decreasing the pressure at the cloud point leads to further phase separation. The cloud point is determined in part by the pressure, temperature, solution composition and the solvent used for polymerization.

It is generally undesirable to have phase separation occur within the polymerization reactor, and process conditions such as monomer concentration, temperature and pressure are controlled to avoid liquid-liquid phase separation. For example, the polymerization temperature may be kept between the crystallization boundary and the LCST of the polymer solution for a given pressure, solvent and monomer concentration. However, once the polymer solution leaves the reactor, it may be beneficial to promote liquid-liquid phase separation as it can facilitate separation of volatile components from the polymer product.

U.S. Pat. Nos. 3,553,156 and 3,726,843 assigned to du Pont de Nemours describes a process in which the reactor effluent, an elastomeric ethylene copolymer solution, is induced to undergo a liquid-liquid phase separation into "polymer rich" and "polymer lean" fractions through the release of pressure by use of a pressure let down valve. The two liquid phases are decanted from one another in a settlement chamber and the polymer rich phase is fed into a low-pressure separator to boil off residual solvent and un-reacted monomer. The polymer lean phase is recycled to the reactor. The process reduces substantially the energy lost by evaporation of volatiles (i.e. the heat of vaporization) in a devolatilization chamber by separating out the volatiles in a "polymer lean" liquid phase.

In U.S. Pat. No. 4,857,633 assigned to Exxon Research & Engineering, a high temperature solution process is described in which a low molecular weight hydrocarbon is added to a polymer solution to facilitate phase separation of a polymer solution under certain conditions of temperature and pressure.

U.S. Pat. No. 6,881,800 assigned to ExxonMobil, discloses a process and apparatus to separate a polymer solution into polymer rich and polymer lean liquid phases prior to devolatilization. The apparatus includes a pressure source, a polymerization reactor, a pressure let-down device, and a separator downstream of one another respectively. In the process, the high pressure source is used to maintain a single liquid phase in the polymerization reactor, while the pressure let-down device facilitates the formation of a two-phase liquid-liquid system having a polymer rich phase and a polymer lean phase. Separation of these phases is accomplished by way of a liquid phase separator that feeds the polymer rich phase to a chamber at lower pressure in order to flash off residual solvent and un-reacted monomer.

Similarly, U.S. Pat. No. 5,599,885 assigned to Mitsui Petrochemicals, describes a solution polymerization process in which phase separation downstream of the reactor is used to facilitate polymer isolation. The reactor effluent is separated into a lower phase, which is rich in polymer, and an upper phase, which is rich in solvent by increasing the temperature of the polymer solution within a "separation zone". The temperature is raised to more than 180° C. above the upper cloud point temperature of the polymer solution. Polymer is recovered from the lower phase, while the upper phase is in part recycled to the reactor.

In U.S. Pat. No. 4,444,922 an improved phase separation process is described. Temperatures and pressures are moderated to produce "spinodal decomposition" driven phase separation as opposed to "nucleation and growth" driven phase separation. Spinodal decomposition driven phase separation is a form of phase separation that promotes rapid partitioning and settling of the polymer lean and polymer rich phases. The process facilitates separation of the distinct liquid phases by way of a liquid-liquid separator or a decanter.

The use of heat exchangers in high temperature processes such as the solution polymerization processes described above or in other processes such as hydrocarbon refining may lead to fouling of the heat exchanger surface. Build up of foulant material will, over time, reduce efficiency of heat transfer across the heat exchange surface and increase the pressure drop across the heat exchanger by restricting flow. This can negatively impact production rates by reducing the throughput in a heat exchanger. As such, several methods for removing foulant material or deposits from a heat exchanger have been developed.

U.S. Pat. No. 4,773,357 describes a method, in which a water cannon is used to physically dislodge deposited foulant material from the tube sheet in a shell and tube type heat exchanger.

In U.S. Pat. No. 5,006,304 a heat exchanger is submerged in a liquid, such as water, and then treated to one or more pressure pulses that knock foulant material free from the heat exchanger tubes.

A two-step pressure pulse cleaning process using a combination of heated cleaning fluids has been described in U.S. Pat. No. 5,601,657.

Alternatively, European Patent 110,456 describes a blast cleaning method in which an abrasive material such as sand is passed through the tubes of a heat exchanger to physically collide with the deposits, thereby removing them from the surface of the tubes.

Examples in which a brushing device is used to physically scrape deposits free from heat exchanger tubes are described in U.S. Pat. Nos. 4,917,176 and 4,676,301.

The above methods require that the heat exchanger be taken "off line" for lengthy periods to effect a thorough cleaning. Partially in response to this limitation, chemical cleaning methods have also been developed. Typically a solvent, which can partially dissolve the foulant, is passed through the heat exchanger under an externally imposed pressure gradient. These chemical cleaning agents can be used to clean the tube-side or the shell-side of a standard shell and tube type heat exchanger. Due to their ease of use, chemical cleaning agents can reduce off-stream times and in some cases can be used to clean a heat exchanger without taking it off-line.

Examples of heat exchanger cleaning agents include aromatic solvent compositions as is described in U.S. Pat. No. 6,187,109 and polar organic solvents such as those described in U.S. Pat. No. 6,283,133.

Canadian Patent 1,142,470 discloses a method for using polyalkylene amines in a hydrocarbon stream for the in-line cleaning of heat exchanger tubes for use with hydrocarbon cracking equipment.

A method for using chemical agents for the "on-line" cleaning of a heat exchanger and its associated process equipment is described in U.S. Pat. No. 6,644,326. A high boiling aromatic solvent is passed through an apparatus for solution polymerization where it helps to dissolve foulant polymeric materials that have deposited on the heat exchanger surfaces.

In general however, the use of high boiling solvents, including aromatic reagents, are problematic for "on-line" cleaning of a solution phase polymerization plant. For example, in U.S. Pat. No. 5,599,885 assigned to Mitsui Petrochemicals, a solution polymerization process is provided in which the catalyst components are added to the polymerization reactor as a slurry in an aliphatic hydrocarbon diluent. The hydrocarbon diluent has a boiling point below 100° C. The use of more polar, more solubilizing, high boiling aromatic solvents, such as toluene, are specifically avoided, as they are difficult to remove from polymer product during devolatilization processes.

In light of the foregoing, there remains a need for a high temperature solution polymerization process in which a heat exchanger can be cleaned without requiring costly and time consuming reactor shut downs or the introduction of undesirable chemical agents such as high boiling, sometimes toxic aromatic solvents or reactive polar solvents.

SUMMARY OF THE INVENTION

The current invention provides a simple "on-line" heat exchanger cleaning method. Lowering the pressure at the back end of a heat exchanger deliberately induces a pressure drop across the heat exchanger, which increases the fluid shear stress forces on the "tube side" walls of the heat exchanger. Increasing the fluid shear stress on the walls of the heat exchanger discourages foulant material from accumulating within the heat exchanger tubes and helps to remove deposits that are present.

In the current invention, lowering the pressure at the back end of a heat exchanger can also induce phase separation of the polymer solution within the heat exchanger to give polymer lean and polymer rich phases. Formation of a liquid-liquid "emulsion" can provide a large pressure drop across a heat exchangers by increasing the apparent viscosity of the polymer solution, which improves scouring of the heat exchanger tubes. Although phase separation has been used to facilitate solvent/monomer separation from the polymer solution as discussed above, it has not previously been used to facilitate cleaning of a heat exchanger as in the current invention.

The method of the current invention overcomes problems associated with the addition of chemical cleaning agents such as the separation of high boiling volatiles, toxicity or incompatibility with polar solvents. The method also makes it unnecessary to take a heat exchanger "off line" or to shut down a polymerization reactor in order to clean a heat exchanger. The method leads to considerable improvements in on-stream time between reactor shut downs and to more consistent polymer production rates.

Disclosed is a high temperature solution polymerization process comprising:

a) polymerizing one or more olefins in a solvent within a reactor system to produce a single phase polymer solution;

b) quenching the polymerization reaction by adding a catalyst deactivator to the polymer solution effluent from said reactor system;

c) feeding the polymer solution effluent from the reactor system through one or more heat exchangers to increase the temperature of the polymer solution; and d) feeding the polymer solution effluent from the one or more heat exchangers to a devolatilization system; the improvement of which comprises a method for the on-line cleaning of the one or more heat exchangers, wherein the method comprises periodically reducing the pressure at the back end of one or more of the heat exchangers using a pressure control valve downstream of one or more of the heat exchangers, wherein reducing the pressure at the back end of one or more of the heat exchangers deliberately creates a positive pressure differential across the one or more heat exchangers.

In an embodiment of the current invention, the polymer solution composition, the temperature and the pressure gradient within a heat exchanger, during normal production of polymer will be such that a transient reduction in the pressure at the back end of a heat exchanger, $P_{OUT}$ can induce the polymer solution to undergo phase separation within a heat exchanger to provide a liquid-liquid two phase polymer solution having a higher apparent viscosity than the corresponding single phase polymer solution.

In an embodiment of the invention, the pressure at the back end of a heat exchanger is periodically reduced by an amount sufficient to induce the single phase polymer solution to undergo phase separation within the heat exchanger to give a two phase liquid-liquid polymer solution.

In another embodiment of the invention, the pressure at the back end of a heat exchanger is periodically reduced by an amount sufficient to induce the single phase polymer solution to undergo phase separation within the heat exchanger to give a two phase liquid-liquid polymer solution with an apparent viscosity greater than the apparent viscosity of the single phase polymer solution.

In another embodiment, a positive pressure differential is deliberately induced across a plurality of heat exchangers using a pressure control valve downstream of each of the heat exchangers.

In another embodiment of the invention, a transient positive pressure differential, $(P_{IN}-P_{OUT})$TRANSIENT is induced across one or more heat exchangers, and the transient positive pressure differential, $(P_{IN}-P_{OUT})$TRANSIENT is equal to or greater than the steady state pressure gradient, $(P_{IN}-P_{OUT})$STEADY STATE present across the one or more heat exchangers during normal production of polymer.

In another aspect of the current invention, a high temperature solution polymerization process comprising:

a) polymerizing one or more olefins in a solvent within a reactor system to produce a single phase polymer solution;

b) quenching the polymerization reaction by adding a catalyst deactivator to the polymer solution effluent from said reactor system;

c) feeding the polymer solution effluent from the reactor system through one or more heat exchangers to increase the temperature of the polymer solution; and d) feeding the polymer solution effluent from the one or more heat exchangers to a devolatilization system; the improvement of which comprises a method for the on-line cleaning of the one or more heat exchangers, wherein the method comprises periodically creating a positive pressure differential across the one or more heat exchangers by deliberately changing the thermodynamic state of the polymer solution within the one or more heat exchangers so that the polymer solution undergoes a liquid-liquid phase separation within the one or more heat exchangers to give a two phase polymer solution, provided that the apparent viscosity of the two phase liquid-liquid polymer solution is higher than the apparent viscosity of the single phase polymer solution.

Changing the thermodynamic state of the polymer solution involves one or more of the steps comprising:

i) reducing the outlet pressure, $P_{OUT}$ of one or more of the heat exchangers;

ii) increasing the temperature of the polymer solution;

iii) increasing the ethylene concentration in the polymer solution;

iv) decreasing the polymer concentration in the polymer solution; and v) adding a low molecular weight hydrocarbon or inert gas to the polymer solution.

The heat exchanger cleaning process of the current invention may be applied to any solution phase polymerization reaction including the homopolymerization or copolymerization of one or more olefins selected from the group comprising ethylene, propylene, styrene, or diene monomers.

DETAILED DESCRIPTION

Solution processes for the homo-polymerization or co-polymerization of ethylene are well known in the art. Solution polymerization processes are used commercially to prepare a wide variety of ethylene polymers, ranging from crystalline polyethylene plastics to amorphous ethylene-propylene elastomers. It is desirable to operate these processes at high temperatures because increasing the polymerization temperature can (a) improve the rate of polymerization; (b) lower the viscosity of the polymer solution; and (c) reduce the amount of energy required to recover the polymer from the solvent.

Solution processes are commonly conducted in the presence of an inert hydrocarbon solvent, typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

The polymerization temperature in a high temperature solution process is from about 80° C. to about 300° C., preferably from about 120° C. to 250° C. The upper temperature limit will be influenced by considerations which are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature will preferably be between 200° C. and 300° C. The most preferred reaction process is a "medium pressure process", meaning that the pressure in the reactor is preferably less than about 6,000 psi (about 42,000 kilopascals or kPa). Preferred pressures are from 10,000 to 40,000 kPa, most preferably from about 2,000 psi to 3,000 psi (about 14,000-22,000 kPa).

The pressure in the reactor system should be high enough to maintain the polymerization solution as a single phase polymerization solution and to provide the necessary upstream pressure to feed the polymer solution from the reactor system through a heat exchanger system and to a devolatilization system.

Suitable monomers for co-polymerization with ethylene include $C_{3-20}$ mono- and di-olefins. Preferred comonomers include $C_{3-12}$ alpha olefins which are unsubstituted or substituted by up to two $C_{1-6}$ alkyl radicals; $C_{8-12}$ vinyl aromatic monomers which are unsubstituted or substituted by up to two substituents selected from the group consisting of $C_{1-4}$ alkyl radicals; $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, 1-decene, butadiene, styrene, alpha methyl styrene, and the constrained-ring cyclic olefins such as cyclobutene, cyclopentene, dicyclopentadiene, norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

The polyethylene polymers which may be prepared in accordance with the present invention are linear low density polyethylenes (LLDPE's) which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc (the so-called very low and ultra low density polyethylenes).

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The solution polymerization process of this invention uses a stirred "reactor system" comprising one or more stirred polymerization reactors. In a dual reactor system, the first polymerization reactor preferably operates at lower temperature. The residence time in each reactor will depend on the design and the capacity of the reactor. Generally the reactors should be operated under conditions to achieve a thorough mixing of the reactants. In addition, it is preferred that from 20 to 60 weight % of the final polymer is polymerized in the first reactor, with the balance being polymerized in the second reactor. On leaving the reactor system the polymer solution is quenched with a suitable catalyst deactivator and passed through a heat exchanger to a devolatization system and polymer finishing area as described further below.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc (e.g. U.S. Pat. No. 5,589,555, issued Dec. 31, 1996).

The catalyst components may be fed to a reaction either as a slurry or solution in any one or a number of different hydrocarbons including aromatic and non-aromatic hydrocarbons.

Other polymers that can be made in a solution polymerization process according to the current invention, include but are not limited to homopolymers, copolymers and terpolymers of one or more of propylene, styrene and butadiene.

Catalysts useful for solution polymerization are well known in the art. In general the invention can be used with any single site catalyst (SSC), Ziegler-Natta catalyst, chromium catalyst or any other organometallic catalyst capable of polymerizing olefins in a solution process.

Single site catalysts generally contain a transition element of Groups 3-10 of the Periodic Table and at least one supporting ligand. Some non-limiting examples of single site catalysts include metallocenes which contain two functional cyclopentadienyl ligands (see for example WO 9941294), constrained geometry catalysts (see for example EP 418044) and catalysts having at least one phosphinimide ligand (see for example U.S. Pat. No. 6,777,509).

Single site catalysts are typically activated by suitable cocatalytic materials (i.e. "activators") to perform the polymerization reaction. Suitable activators or cocatalytic materials are also well known to those skilled in the art. For example, suitable cocatalysts include but are not limited to electrophilic boron based activators and ionic activators, which are well know for use with metallocene catalysts, constrained geometry catalysts and catalysts having at least one phosphinimide ligand (see for example, U.S. Pat. Nos. 5,198,401 and 5,132,380). Suitable activators including boron based activators are further described in U.S. Pat. No. 6,777,509. In addition to electrophilic boron activators and ionic activators, alkylaluminum, alkoxy/alkylaluminum, alkylaluminoxane, modified alkylaluminoxane compounds and the like can be added as cocatalytic components. Such components have been described previously in the art (see for example U.S. Pat. No. 6,777,509).

The term "Ziegler Natta catalyst" is well known to those skilled in the art and is used herein to convey its conventional meaning. Ziegler Natta catalysts comprise at least one transition metal compound of a transition metal selected from groups 3, 4, or 5 of the Periodic Table (using IUPAC nomenclature) and an organoaluminum component, which is defined by the formula:

$$Al(X')_a(OR)_b(R)_c$$

wherein: X' is a halide (preferably chlorine); OR is an alkoxy or aryloxy group; R is a hydrocarbyl (preferably an alkyl having from 1 to 10 carbon atoms); and a, b, or c are each 0, 1, 2, or 3 with the provisos, a+b+c=3 and b+c>=1. As will be appreciated by those skilled in the art of ethylene polymerization, conventional Ziegler Natta catalysts may also incorporate additional components such as an electron donor. For example, an, amine or a magnesium compound or a magnesium alkyl such as butyl ethyl magnesium and a halide source (which is typically a chloride such as tertiary butyl chloride). Such components, if employed, may be added to the other catalyst components prior to introduction to the reactor or may be directly added to the reactor. The Ziegler Natta catalyst may also be "tempered" (i.e. heat treated) prior to being introduced to the reactor (again, using techniques which are well known to those skilled in the art and published in the literature).

The current invention also contemplates the use of chromium catalysts that are also well known in the art. The term "chromium catalysts" describes olefin polymerization catalysts comprising a chromium species, such as silyl chromate, chromium oxide, or chromocene on a metal oxide support such as silica or alumina. Suitable cocatalysts for chromium catalysts, are well known in the art, and include for example, trialkylaluminum, alkylaluminoxane, dialkoxyalkylaluminum compounds and the like.

In the current invention the term "polymer solution" can be any solution containing both dissolved or molten homo- or co-polymer, one or more solvents, one or more catalyst components, and one or more monomers. The polymer solution may also contain quenching reagents as well as dissolved inert gases or dissolved hydrogen gas.

The effluent polymer solution from the reactor (or from the final reactor if two or more reactors are used in series) is quenched by addition of a catalyst deactivator and then heated by passage through one or more heat exchangers. The catalyst deactivator suppresses or stops further polymerization within the polymer solution. The heat exchanger effluent is fed to a flash devolatilization system.

Catalyst deactivators can be used either to slow down the rate of polymerization or to stop it entirely. In a typical solution plant, the deactivators used, substantially stop the polymerization reaction, by changing the active catalyst into an inactive form. Most commonly, these activators take the form of polar molecules containing active hydrogen atoms and/or atoms which are capable of irreversibly binding to the metal center of the active catalyst.

Suitable deactivators are well known in the art and include but are not limited to amines (see U.S. Pat. No. 4,803,259 to Zboril et al.); alkali or alkaline earth metal salts of carboxylic acid (see for example U.S. Pat. No. 4,105,609 to Machon et al); water (see for example U.S. Pat. No. 4,731,438 to Bernier et al); hydrotalcites (see U.S. Pat. No. 4,379,882), alcohols and carboxylic acids (see U.S. Pat. No. 4,379,882).

Generally, the catalyst deactivators will be added in the minimum amount required to substantially quench the polymerization reaction. This in turn minimizes cost, but also the amount of un-reacted catalyst deactivators present in the product resin.

The use of one or more deactivators or mixtures thereof is also contemplated by the current invention.

In an embodiment of the current invention, each heat exchanger will be a shell and tube type heat exchanger. Due to their ease of operation and to their good reliability, shell and tube heat type heat exchangers have become a preferred means for cooling or heating fluid flows and are well known in the art. However, other heat exchangers including but not limited to double pipe, flat-plate and spiral wound heat exchangers may also be used with the current invention.

In a heat exchanger, a "hot" fluid is brought into thermal contact with a "cold" fluid facilitating heat transfer across a heat exchange surface. The heat transfer may occur by a forced convection or a condensation mechanism. The heat exchange surface is preferably constructed from stainless steel or from other suitable metal alloys that allow for good heat transfer. A typical shell and tube heat exchanger is comprised of an open shell like structure, the "shell side" which encases a number of tubes that traverse the length of the shell structure. The inside of the tubes is collectively designated as the "tube side". The tubes are held in a "tube sheet" at each end of the shell housing, the tube sheet forming a barrier between the tube channels and the inside of the shell. The shell housing is equipped with an inlet and an outlet, between which a series of baffles may be placed to provide a torturous fluid flow pathway. During heat exchange, a fluid flow traverses the distance from inlet to outlet on the "shell side" of the exchanger, and comes into thermal contact with a fluid flow traversing the length of the tubes on the "tube side" of the exchanger. The "tube side" of a heat exchanger can also be said to have an inlet and an outlet upstream and downstream of each end of the tube sheet respectively.

In a preferred embodiment of the current invention a "hot" fluid flows though a heat exchanger on the "shell side", while a "cold" fluid (the polymer solution) passes through the heat exchanger on the "tube side". The heating fluid may be, but is not limited to, steam, oil, or recycled monomer/solvent streams. Without wishing to be bound by theory, the heat transfer may occur via a forced convention or condensation mechanism. In a preferred embodiment of the current invention, the heating fluid is high pressure steam.

Increasing the number of tubes that are enclosed within the shell structure increases the overall surface area of the heat exchange surface between the two fluids. In a preferred embodiment, the number of tubes is sufficient to provide efficient heat transfer to a polymer solution passing through the heat exchanger at a mass flow rate of more than about 180-400 tons/h. In one embodiment, the tubes may be 0.5 to 1.0 inch in diameter and there may be over 3000 tubes in a heat exchanger tube sheet. In another embodiment, static mixing inserts can be added to the tubes to improve polymer solution mixing and heat transfer efficiency.

Heat exchangers used in the current invention may be of a single-pass or a multi-pass type, examples of which are well known in the art. The flow of fluids through the heat exchanger may be cross or counter flow (flow of "hot" and "cold" fluids is in approximately opposite directions) or unidirection parallel flow ("hot" and "cold" fluids flow in approximately the same direction). The fluid on the shell side may also condense to yield efficient heat transfer. In a preferred embodiment, a one pass shell and tube heat exchanger is operated in a cross-counter flow arrangement. Heat exchangers may be configured vertically or horizontally, but are preferably in a vertical configuration.

In the current invention, heat exchangers will have a "tube side" polymer solution inlet temperature, $T_{cold,inlet}$ (i.e. the temperature at the front end or upstream end of the heat exchanger tube sheet) and a "tube side" polymer solution outlet temperature, $T_{cold,outlet}$ (i.e. the temperature at the back end or the downstream end of the heat exchanger tube sheet), since the polymer solution is the "cold" fluid and flows through the tube side of the heat exchanger. The polymer solution flowing through a heat exchanger will have a temperature that increases along a temperature gradient as it flows from inlet to outlet. For a heat exchanger immediately downstream of the reactor system, the $T_{cold,inlet}$ will be similar to the temperature in the final polymerization reactor and can be in the range of between about 150° C. and 230° C. Similarly, the heat exchangers will have a "shell side" heating fluid (i.e. the "hot" fluid) inlet temperature, $T_{hot,inlet}$ and a "shell side" heating fluid outlet temperature, $T_{hot,outlet}$. The $T_{cold,inlet}$, $T_{hot,inlet}$, $T_{hot,outlet}$, and $T_{cold,outlet}$ can be determined by any well known method, such as but not limited to the use of a thermocouple device.

In an embodiment of the invention, a single heat exchanger can be used, provided sufficient heat is transferred to the polymer solution for efficient devolatilization. In another embodiment of the current invention, the use of a combination of heat exchangers individually in series or in parallel can be used to achieve sufficient heat transfer to the polymer solution for efficient devolatilization. Sufficient temperatures are from about 220° C. to 300° C. (i.e. $T_{cold,outlet}$ of the final heat exchanger immediately upstream of the devolatilizer is from 220° C. to 300° C.). In another aspect of the invention the $T_{cold,outlet}$ will be from 250° C. to 300° C.

A heat exchanger will have a "tube side" inlet pressure, PIN (i.e. the pressure at the front end or upstream end of the heat exchanger tube sheet) and a "tube side" outlet pressure, $P_{OUT}$ (i.e. the pressure at the back end or downstream end of the heat exchanger tube sheet). In the current invention, $P_{IN}$ will be greater than $P_{OUT}$ such that $P_{IN}-P_{OUT}$ is positive. $P_{IN}$ and $P_{OUT}$ are readily measured using any well known technique, such as but not limited to transducers or pressure gauges.

The heat exchanger inlet and outlet pressures can be adjusted using pressure let-down valves that are upstream and downstream of a heat exchanger respectively. If two or more heat exchangers are used in series then additional pressure let down valves may be incorporated such that there is at least one let down pressure valve between each of the heat exchangers.

In an embodiment of the current invention, two or more heat exchangers are used in series, each of which is downstream of a final polymerization reactor, and upstream of a flash devolatilization system.

The efficiency of heat transfer within a shell-and-tube heat exchanger with one or more tube passes is expressed using the overall heat transfer coefficient, U. The overall heat transfer coefficient, U for each heat exchanger is related to the total rate of heat transferred in that heat exchanger, Q. The total rate of heat transfer, Q can be determined from the temperature rise of the fluid on the tube side of the heat exchanger or from the loss of enthalpy from the heating fluid on the shell side of the heat exchanger using the following equation, $$Q = FUA\Delta T_{lm} \qquad \text{(Eqn. 1)}$$

where F is a heat exchanger design factor, which is in the current invention has been preset to equal one (the F design factor is a characteristic of a given heat exchanger design and is a dimensionless quantity often equal to about one), A is the area available for the heat transfer through the tube walls, and $\Delta T_{lm}$ is the log mean temperature difference across the heat exchanger. The log mean temperature difference is a function of inlet and outlet temperatures on the colder and hotter sides of the heat exchanger respectively, $$\Delta T_{lm} = \frac{\Delta T_1 - \Delta T_2}{\ln(\Delta T_1 / \Delta T_2)} \qquad \text{(Eqn. 2)}$$

where $\Delta T_1 = T_{hot,inlet} - T_{cold,outlet}$ and $\Delta T_2 = T_{hot,outlet} - T_{cold,inlet}$ for a cross-counter flow heat exchanger. In the present invention, the polymer solution is the "cold" fluid flowing through the tube side of the heat exchanger. Hence, at the upstream side of the heat exchanger, the tube side inlet temperature is defined as the $T_{cold,inlet}$. The "hot fluid" flowing through the shell side has an inlet temperature, defined as the $T_{hot,inlet}$. Similarly, the downstream end of the heat exchanger has a tube side, $T_{cold,outlet}$ and a shell side $T_{hot,outlet}$. For a given heat exchanger, A is known. The values of Q and $\Delta T_{lm}$ are determined from the process conditions. The value of Q is determined from the enthalpy change, either of the tube side fluid or of the shell side fluid. The enthalpy change can be determined by integrating the heat capacity of a fluid, when there is no phase change of the fluid, or from the enthalpy of condensation of the fluid when there is condensation. Equation 1 is then used to calculate the value of the heat transfer coefficient, U under a given set of process conditions. The more efficient a heat exchanger with a given heat exchange surface area is, the larger the value of the heat transfer coefficient, U. Equation 1 can be used to characterize the heat transfer rates, and hence the coefficient U, in heat exchangers conveying single or multiphase fluids. U is conveniently expressed in $kW/m^2/K$.

Cleaning the Heat Exchangers

Heating a polymer solution by passage through one or more heat exchangers reduces the polymer solution viscosity and facilitates the flashing of solvent downstream in the devolatilization steps. Although heating a polymer solution helps to maintain suitably high mass flow rates, over time, foulant material may become deposited on the "tube side" walls of the heat exchanger. The presence of foulant material within the heat exchangers may be indicated by the presence of black colored specs in the product resin. Alternatively, fouling may be indicated by a decrease in the efficiency of the heat exchanger system. For example, the temperature of the polymer solution at $T_{OUT}$ may fall off over time or the value of the heat transfer coefficient, U may decrease over time. Foulant materials in the heat exchangers can also build up to such a degree that, the polymer solution mass flow rates are negatively impacted. This scenario may be indicated by a gradual decline in the magnitude of the pressure drop $P_{IN}-$ $P_{OUT}$ across the heat exchanger tubes during normal production of polymer, and can lead to hydraulic pumping limitations.

Without wishing to be bound by theory, foulant materials may arise from the reactions associated with quenching the polymerization reaction downstream of the reactor system. By way of example, addition of alcohols to the polymer solution may generate insoluble inorganic salts or inorganic polymeric materials from one or more of the co-catalytic catalyst components.

For the operation of a solution polymerization plant, a steady state pressure gradient is established to ensure that polymer flows from the reactor system, through a heat exchanger, to the devolatilization system. The magnitude of the pressure gradient across the heat exchangers during steady state operation, is not especially important so long as $P_{IN}$ is larger than $P_{OUT}$. By way of example only, the steady state pressure gradient across a heat exchanger, $(P_{IN}-P_{OUT})_{STEADY\ STATE}$ can be at least 0.1 MPa.

For the purposes of the current invention, the term "positive pressure differential" is that pressure drop periodically and deliberately induced across a heat exchanger, $(P_{IN}-P_{OUT})_{TRANSIENT}$. The "positive pressure differential", $(P_{IN}-P_{OUT})_{TRANSIENT}$ is that pressure drop induced across a heat exchanger, beyond that pressure gradient already present during normal production of polymer. The inventive methods of the current invention will deliberately create a transient "positive pressure differential" across a heat exchanger, which in turn cleans the heat exchanger. Thus the term "positive pressure differential" does not define the total final pressure drop across a heat exchanger (i.e. the deliberately induced pressure drop+the pressure gradient present during normal production of polymer), but the pressure drop deliberately created by the method of the invention.

In an embodiment of the current invention, a transient positive pressure differential, $(P_{IN}-P_{OUT})_{TRANSIENT}$ is deliberately created in a heat exchanger by opening a pressure control valve that is downstream of a heat exchanger to reduce the outlet pressure, $P_{OUT}$ at the back end of a heat exchanger. By way of example, after reducing downstream pressure, for a period of 2 or more hours, the pressure control valve may be closed to re-establish normal operating pressures across a heat exchanger. The period of 2 or more hours is not meant to be limiting and shorter or longer time periods may be used.

In a preferred embodiment of the invention, the transient positive pressure differential, $(P_{IN}-P_{OUT})_{TRANSIENT}$ induced across a heat exchanger will be equal to or greater than the steady state pressure gradient, $(P_{IN}-P_{OUT})_{STEADY\ STATE}$ present across the heat exchanger during normal production of polymer.

It is also contemplated by the current invention, that one or more pressure control valves may be used in combination with one or more heat exchangers. When more than one heat exchanger is used, then the heat exchangers can be arranged independently in series or in parallel. The transient positive pressure differential is deliberately induced across the one or more heat exchangers either individually or in combination.

In a preferred embodiment of the invention, the transient positive pressure differential, $(P_{IN}-P_{OUT})_{TRANSIENT}$ induced across one or more heat exchangers will be equal to or greater than the steady state pressure gradient, $(P_{IN}-P_{OUT})_{STEADY\ STATE}$ present across the one or more heat exchangers during normal production of polymer.

Without wishing to be bound by theory, creating a positive pressure differential across a heat exchanger increases the fluid shear stress exerted by the polymer solution on the "tube side" walls of the heat exchanger. An increase in shear stress dislodges deposits or prevents foulant material from accumulating within the heat exchanger tubes.

The relationship between a pressure drop, $\Delta P$ in MPa and the wall shear stress, $\tau_W$ exerted by the polymer solution can be approximated by Equation 3, which is valid for a Newtonian fluid flowing through a tube:

$$\Delta P = P_{IN} - P_{OUT} = \frac{2L\tau_W}{R} \qquad \text{(Eq. 3)}$$

where $P_{IN}$ is the pressure at the heat exchanger tube sheet inlet in MPag, $P_{OUT}$ is the pressure at the heat exchanger tube sheet outlet in MPag, L is the length of the heat exchanger tube in meters, R is the radius of the heat exchanger tube in meters, and $\Delta P$ and $\tau_W$ are defined as above.

In an embodiment of the current invention, a positive pressure differential, $(P_{IN}-P_{OUT})_{TRANSIENT}$ may be maintained by the use of a positive displacement pump upstream of a heat exchanger. The pump maintains a constant mass flow rate, m(dot) against a variable head pressure that is controlled by a pressure let down valve, downstream of a heat exchanger. The mass flow rate, m(dot) of a polymer solution flowing through a heat exchanger tube, can be approximately determined from the equation: m(dot)=density×tube cross–sectional area×velocity. Other pumps that do not adjust the flow rate according to upstream pressure changes, such as centrifugal pumps, are also contemplated for use with the current invention.

In a preferred embodiment of the current invention, reducing the outlet pressure, $P_{OUT}$ of a heat exchanger, by using a pressure control valve, induces a single phase polymer solution to undergo phase separation, giving two distinct liquid phases within a heat exchanger. The two new liquid phases comprise a polymer-lean phase and a polymer-rich phase. A "polymer lean" phase is defined as having at least 90 weight percent (wt %) of solvent. A "polymer-rich" phase is defined as having at least 10 weight percent (wt %) of polymer.

In the current invention, concentration is typically expressed in terms-of weight percent or wt % of a component in a polymer solution.

Phase separation behavior and more specifically, cloud point determination of polymer solutions flowing through a heat exchanger, can be modeled off-line using representative polymer solutions of known composition. In the current invention, phase separation data in the form of a vapor-liquid-liquid (VLL) diagram is obtained using a multi-pass rheometer (MPR). The multi-pass rheometer is a capillary rheometer in which several capillaries of different lengths and diameters are enclosed within a high temperature/pressure cell that is capable of confining a solution. The vertical cell has pistons at both ends of the cell and during operation, the solution is sheared back and forth through the capillaries. Under conditions in which a steady shear is achieved, the pressure drop across the capillaries, $P_{IN}-P_{OUT}$ is measured and, the apparent viscosity of the fluid is determined as a function of the shear rate in each capillary. Before the shearing is initiated, the pistons are moved with respect to each other in order to obtain a desired static pressure for the system.

The "apparent viscosity", $\mu_A$ of a polymer solution is defined for a given shear rate as the pressure drop, $\Delta P$ or $P_{IN}-P_{OUT}$ across the capillaries when a polymer solution is forced through a capillary of constant diameter, at a constant static pressure, temperature and polymer solution composition. The apparent viscosity, $\mu_A$ is equal to the ratio of "shear wall stress", $\tau_W$, to "wall shear rate", $\dot{\gamma}_{WN}$, for a Newtonian fluid:

$$\mu_A = \frac{\tau_W}{\dot{\gamma}_{WN}} = \frac{R^2 \Delta P}{8LV} \quad \text{(Eq. 4)}$$

where V is the average fluid velocity in the tube in m/s (i.e. the velocity at which the pistons are moved within the capillaries), $\Delta P$ is the pressure drop across the capillaries in MPa (or Pa), L is the length of the capillaries in meters, R is the radius of the capillaries in meters and $\tau_W$ is defined as above.

A person skilled in the art will recognize, that use of a multi-pass rheometer in the prescribed manner, allows for the measurement of the apparent viscosity of representative off-line polymer solutions as a function of temperature, pressure and shear rate.

The apparent viscosity of a polymer solution undergoes a dramatic change at the cloud point pressure, due to the formation of two-liquid phases. Measurement of the cloud point pressure at different temperatures yields a cloud point curve which demarcates the two-liquid region from the single liquid region of the phase diagram for a given polymer solution. By way of example, the phase behavior of a polymer solution of the current invention may be approximated by the isoplethic phase diagram (i.e. a vapor-liquid-liquid phase diagram) for a polymer-solvent mixture containing a small amount of monomer as provided in FIG. 1.

Figure 1:
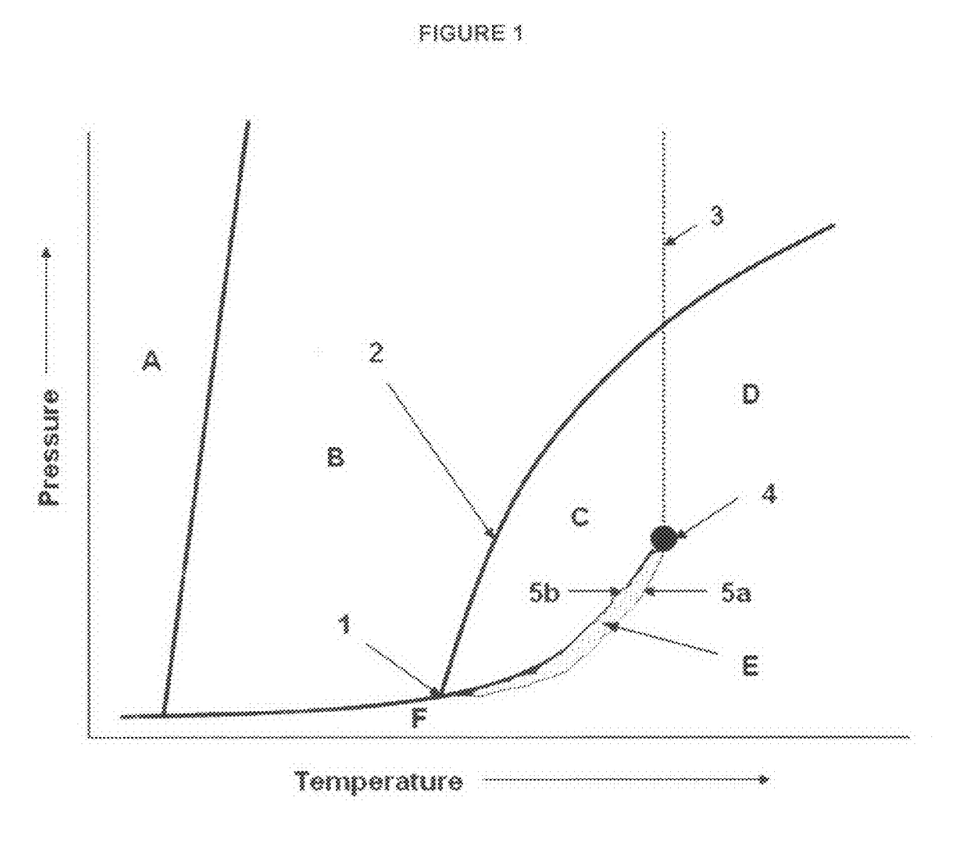
FIG. 1 is a vapor-liquid-liquid (VLL) phase diagram, which shows the phase behavior of a polydisperse polyethylene polymer solution with a small amount of ethylene present.

With reference to FIG. 1, A defines the liquid-amorphous solid region; B defines the single liquid region (i.e. a single phase polymer solution); C defines the liquid-liquid region (i.e. a two phase liquid-liquid polymer solution); D defines the supercritical fluid region; E defines the vapor-liquid-liquid region; F defines the vapor-liquid region; 2 defines the cloud point boundary or the lower critical solution temperature (the LCST) curve; 1 defines the lower critical end point; 3 defines the critical temperature of solvent; and 4 defines solvent vapor-liquid critical point. For the polymer solutions of the current invention, 5a is the lower boundary of the vapor-liquid-liquid region and 5b is the upper boundary of the vapor-liquid-liquid region.

In the current invention, a single phase (i.e. liquid phase) polymerization solution is present in the reactor system, and process conditions, such as but not limited to monomer concentration, temperature and pressure, are controlled to avoid liquid-liquid phase separation in the reactor system.

It will be recognized by one skilled in the art, that the pressure and temperature conditions required for inducing the formation of two liquid phases for a range of polymer solutions can be predicted by generating a curve similar to that shown in FIG. 1. Hence, generation of vapor-liquid-liquid or liquid-liquid phase diagrams for representative polymer solutions allows for the prediction of on-line conditions within a heat exchanger, such as the temperature and pressure under which liquid-liquid phase separation occurs.

A two-phase polymer solution of the current invention may undergo one or more phase inversions during flow through a heat exchanger. Without wishing to be bound by theory, phase-inversion behavior may lead to rapid changes in the apparent viscosity of the two-phase polymer solution. By phase inversion, it is meant that the polymer solution interconverts between a system comprising polymer lean phase droplets dispersed in a continuous polymer rich phase and a system comprising polymer rich phase droplets dispersed in a continuous polymer lean phase.

Figure 2:
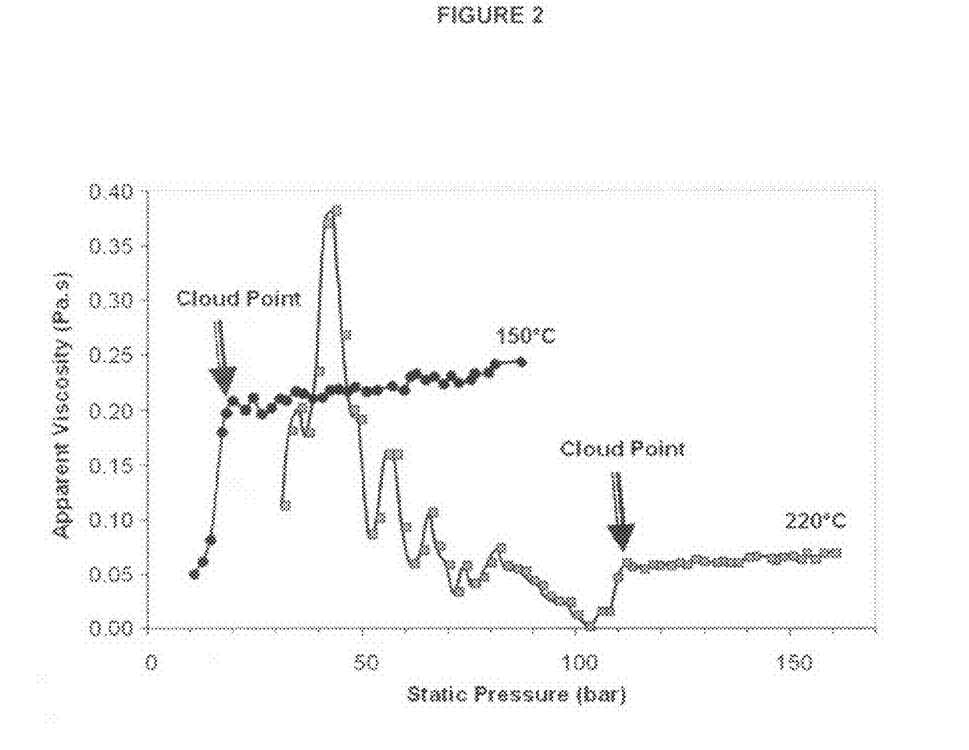
FIG. 2 is a diagram, which shows the relationship between static pressure and apparent viscosity for a 15 wt % polymer solution.

FIG. 2 shows the apparent viscosity of a polymer solution of the current invention at constant temperature and shear rate as a function of static pressure. Two different temperature regimes are shown for a polymer solution of a known composition. The cloud point is indicated by a discontinuity in the apparent viscosity—static pressure curve. A liquid-liquid phase separation occurs as the static pressure is lowered below the cloud point. Below the cloud point, at 220° C., phase inversion occurs for the two-phase liquid-liquid system and the apparent viscosity may be higher or lower than for the single phase polymer solution. When the static pressure is below about 50 bar, the apparent viscosity of the two phase polymer solution is always higher than that of the one phase polymer solution. In contrast, for a temperature of 150° C., the apparent viscosity does not increase at any static pressure below the cloud point, despite the formation of two liquid phases.

It will be recognized by one skilled in the art, that conditions other than pressure, such as for example polymer solution temperature and polymer solution composition must be taken into consideration when determining whether a higher apparent viscosity can be reached by inducing phase separation of a given polymer solution.

In a preferred embodiment of the current invention, the polymer solution composition, the temperature and the pressure gradient within a heat exchanger during normal production of polymer will be such that a reduction in the pressure at the back end of a heat exchanger, $P_{OUT}$ can induce the polymer solution to undergo phase separation within a heat exchanger to provide a liquid-liquid two phase polymer solution having a higher apparent viscosity than the corresponding single phase polymer solution.

Without wishing to be bound by theory, sufficient amounts of a second liquid phase must form to provide an apparent viscosity which is higher than the apparent viscosity of the single phase polymer solution (i.e. the thermodynamic state of the polymer solution must shift to a point sufficiently beyond the cloud point barrier and to within the liquid-liquid phase region in a vapor-liquid-liquid phase diagram).

Increasing the apparent viscosity, $\mu_A$ of the polymer solution increases the shear stress, $\tau_W$ on the tube side walls of a heat exchanger which scrubs deposited foulant materials from the walls of heat exchanger tubes or prevents foulant material from accumulating over time.

In an embodiment of the invention, the pressure at the back end of a heat exchanger is deliberately and periodically reduced by an amount sufficient to induce the single phase polymer solution to undergo phase separation within the heat exchanger to give a two phase liquid-liquid polymer solution.

In a preferred embodiment of the invention, the pressure at the back end of a heat exchanger is deliberately and periodically reduced by an amount sufficient to induce the single phase polymer solution to undergo phase separation within the heat exchanger to give a two phase liquid-liquid polymer solution with an apparent viscosity greater than the apparent viscosity of the single phase polymer solution.

In an especially preferred embodiment of the invention, a transient positive pressure differential, $(P_{IN}-P_{OUT})_{TRANSIENT}$ that is equal to or greater than the steady state pressure gradient, $(P_{IN}-P_{OUT})_{STEADY\ STATE}$ is deliberately created in a heat exchanger by reducing the back end pressure of a heat exchanger by an amount sufficient to induce liquid-liquid phase separation under conditions in which the two phase polymer solution has an apparent viscosity higher than the single phase polymer solution.

It is also contemplated by the current invention, that one or more pressure control valves may be used in combination with one or more heat exchangers. When more than one heat exchanger is used, then the heat exchangers can be arranged independently in series or in parallel with one another. In a preferred embodiment, the positive pressure differential deliberately created across the one or more heat exchangers either individually or in combination, is equal to or greater than the steady state pressure gradient across the one or more heat exchangers.

As further shown by FIG. 1, increasing the temperature of the polymer solution may also help to induce liquid-liquid phase separation of the polymer solution within the heat exchanger, by increasing the temperature of the polymer solution to a temperature above the lower critical solution temperature for a given pressure. FIG. 1, further shows that increases in temperature may be used in combination with lower pressures or that lower temperatures may be used in combination with higher pressures to achieve liquid-liquid phase separation.

The preferred temperatures and pressures for creating a two-phase liquid-liquid polymer solution within a heat exchanger will depend on desired overall process conditions and on the polymer solution composition. Preferred temperatures and pressures for creating a liquid-liquid polymer solution can be predicted by modeling on-line polymer solutions. Modeling the phase behavior of representative polymer solutions can be carried out using phase equilibrium calculations with a suitable thermodynamic model calibrated with liquid-liquid equilibrium data collected using the multi-pass rheometer, MPR, on cloud point conditions and other phase transitions.

In the current invention, cleaning a heat exchanger can be performed without interruption of the polymerization reactor system. For example, it is possible to scrub the heat exchanger while making a commercial Ziegler-Natta resin with a melt index, $I_2$ of 1.0 or less than 1.0 at commercial production rates.

Fouling of a heater exchanger is indicated by the presence of foulant materials in the polymer product. Foulant materials may be indicated by the presence of black specs in the product resin. Hence, cleaning the heat exchanger using the method of the current invention is carried out as needed to minimize the presence of black specs in the product resin. By way of example, a heat exchanger may be cleaned at least once a month, or upon the commencement of a new product campaign. The build up of foulant material in a heat exchanger may also be indicated by an increase in the pressure drop across a heat exchanger during normal operation or by a decrease in the efficiency of the heat transfer in the heat exchanger.

The exact location of the liquid-liquid phase boundary in the present invention (i.e. the temperature and pressure conditions required for obtaining polymer solution phase separation) will depend on a number of other factors including but not limited the weight fractions of polymer, solvent or monomer dissolved in the solution and the polymer molecular weight distribution. As a result, there is no one set of conditions under which phase separation may be induced. For the purposes of this invention, factors such as the weight fraction of monomer dissolved in the polymer solution, the weight fraction of polymer in the polymer solution, the polymer molecular weight, and the solvent composition are such that the liquid-liquid phase boundary is traversable under commercially viable temperatures and pressures.

In a preferred embodiment, the temperatures and pressures employed by the current invention will be such, that a given polymer solution can be induced to undergo phase separation within one or more heat exchangers, to provide a liquid-liquid two phase polymer solution with a higher apparent viscosity than a corresponding single phase polymer solution.

In further embodiments of the current invention, factors other than temperature or pressure, including but not limited to the weight fraction of monomer in the polymer solution, the weight fraction of polymer in the polymer solution, the polymer molecular weight distribution and the solvent composition may be manipulated to induce or co-induce phase separation within one or more heat exchangers. These are discussed in more detail below.

In an embodiment of the current invention, liquid-liquid phase separation of a polymer solution can be induced within a heat exchanger system by increasing the weight fraction of ethylene in the polymer solution or by reducing the weight fraction of polymer in the polymer solution. Methods of increasing the weight fraction of ethylene in the polymer solution are well known in the art and include for example running the polymerization reactor under conditions of low ethylene conversion. In a preferred embodiment the ethylene wt % in the polymer solution is increased relative to the ethylene wt % in the polymer solution before the liquid-liquid phase separation is induced.

Figure 3:
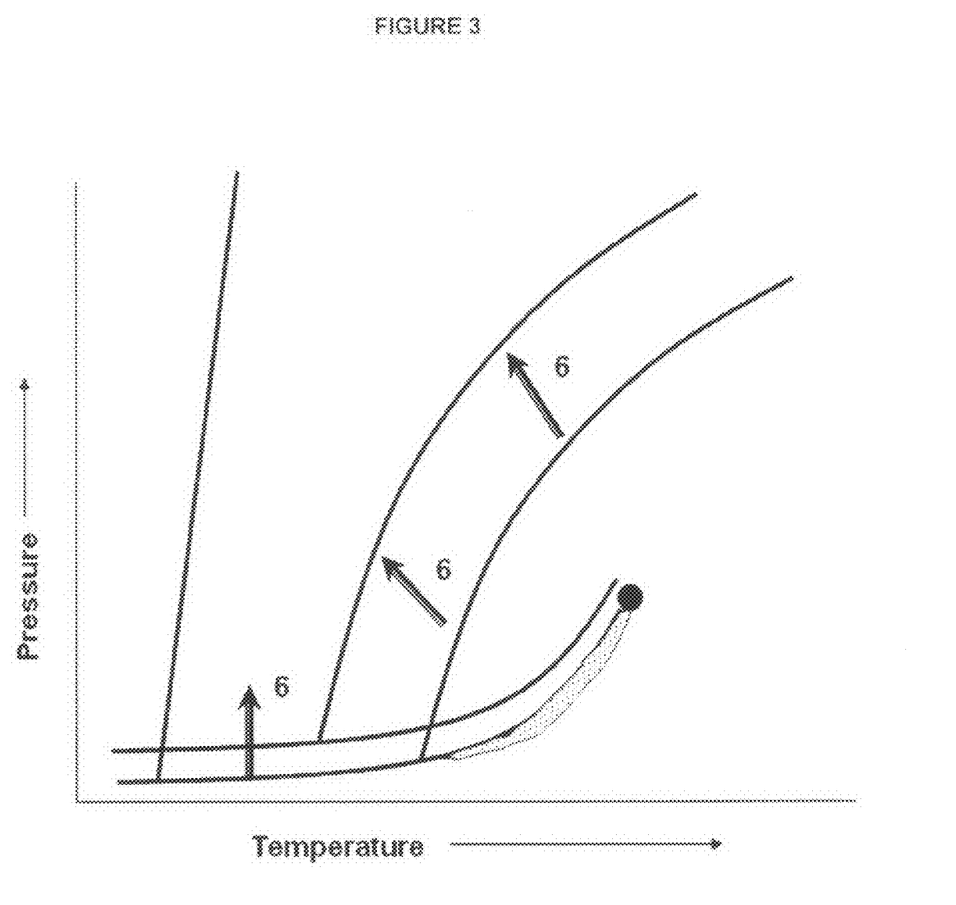
FIG. 3 is a phase diagram, which shows the phase behavior of a polydisperse polyethylene polymer solution having different concentrations of a low molecular weight component.

Isothermal and isobaric curves may be constructed using the MPR techniques described above, to show the effect of ethylene concentration or polymer concentration on the phase separation behavior of a polymer solution. By way of example, FIG. 3 shows the effect of adding ethylene to a polymer solution of the current invention. Increasing the weight per cent (wt %) of ethylene has the effect of shifting the cloud point barrier to the left (as indicated by the numeral 6 in FIG. 3) in the vapor-liquid-liquid phase diagram which in the absence of other changes, pushes a given polymer solution deeper into the two phase region. Alternatively, by shifting the cloud point barrier to the left, liquid-liquid phase separation can be induced at higher pressures or lower temperatures. FIG. 3 is not meant to be limiting and the current invention contemplates the addition of other volatile or low molecular weight components to a polymer solution in order to shift the cloud point barrier to the left in an isoplethic liquid-liquid phase diagram. Such components can include for example, methane, nitrogen or other highly volatile or supercritical compounds whose density is lower than that of the polymerization solvent.

Figure 4:
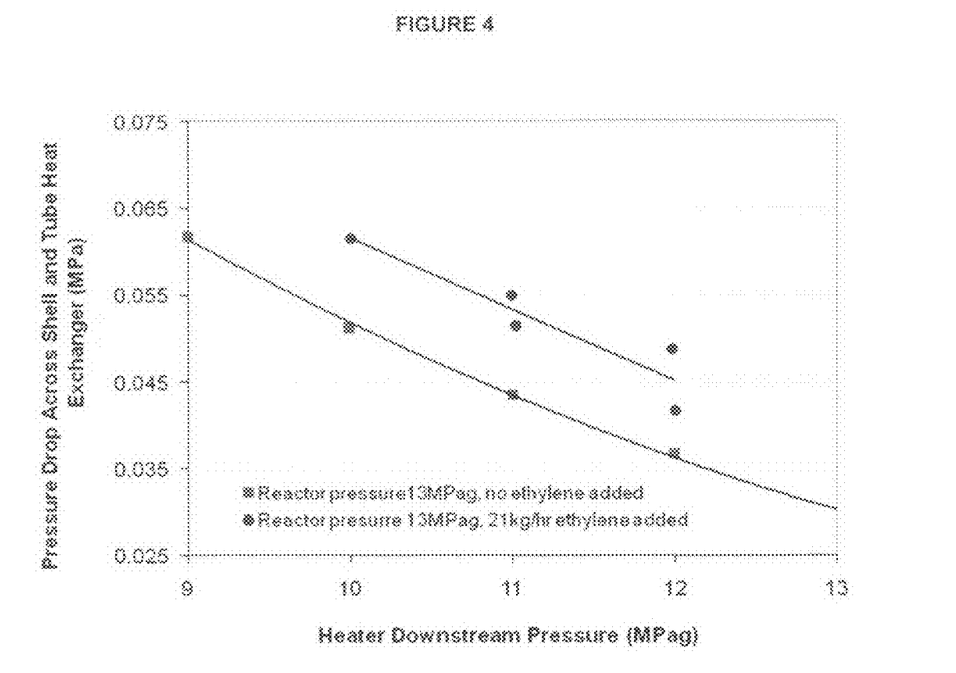
FIG. 4 is a diagram showing the relationship between heater downstream pressure, $P_{OUT}$ and the positive pressure differential created across a shell and tube heat exchanger in the presence and absence of ethylene.

FIG. 4, shows the pressure drop across a heat exchanger, $P_{IN}-P_{OUT}$, created by reducing the outlet pressure, $P_{OUT}$ with and without added ethylene. The pressure drop is larger in the presence of ethylene due to the formation of a liquid-liquid two phase polymer solution having a higher apparent viscosity than the polymer solution obtained in the absence of added ethylene.

Without wishing to be bound by theory, phase separation increases the apparent viscosity of the polymer solution, provided that sufficient amounts of a second liquid phase are formed. This enhances the shear stress on the "tube side" walls, $\tau_w$, which serves to scour foulant material from the heat exchanger tubes.

In an embodiment of the current invention, liquid-liquid phase separation of a polymer solution within a heat exchanger system may be induced by reducing the weight fraction of polymer in the polymer. Methods to decrease the weight fraction of the polymer are well known in the art and include lowering the conversion rate of ethylene or dilution with solvent. Decreasing the weight per cent (wt %) of polymer, has the effect of shifting the cloud point barrier to the left in a liquid-liquid phase diagram for a representative polymer solution. By shifting the cloud point barrier to the left, liquid-liquid phase separation can be induced at higher pressures or lower temperatures. In a preferred embodiment, the polymer wt % in the polymer solution is decreased to an amount that is not less than 0.1 wt %, but less than the polymer wt % in the polymer solution before the liquid-liquid phase separation is induced.

In an embodiment of the current invention, an increase in polymer solution viscosity may be used to increase the wall shear stress, $\tau_w$, exerted by the polymer solution. Without wishing to be bound by theory, the viscosity of a polymer solution may be increased by decreasing the melt index, $I_2$ or increasing the molecular weight, MW of a polymer component. Methods to adjust the molecular weight of the polymer are well known in the art and include for example, changing the conversion rate or the concentration of chain transfer agents in a polymerization reactor.

In a preferred embodiment, the reactor effluent contains an ethylene homopolymer component having a melt index, $I_2$ of less than or equal to about 1. The melt index of a polymer can be determined according to the procedure of ASTM D-1238. Optionally, low conversion rates may be used in the reactor system to produce high molecular weight ethylene homopolymer with a melt index, $I_2$ of 1 or less.

In an embodiment of the current invention, shear wall stress, $\tau_W$ may be increased by increasing the mass flow rate of polymer solution passing through one or more heat exchangers. Increases in mass flow rate will be limited by the nature of the process equipment, and in general, a solution polymerization process is run with mass flow rates already approaching maximum safe operating limits. In a preferred embodiment, the mass flow rate of the polymer solution flowing through the one or more heat exchangers is increased relative to the mass flow rate of the polymer solution flowing through the one or more heat exchangers before the liquid-liquid phase separation is induced.

In the current invention, mass flow rates through a heat exchanger will be from 10 kilograms of polymer solution per hour to 1,000,000 kilograms of polymer solution per hour.

In another embodiment of the current invention, the viscosity of the polymer solution is increased while maintaining an approximately constant mass flow rate through the heat exchangers.

Each of the above methods may be used in combination or alone to deliberately induce or co-induce liquid-liquid phase separation within a heat exchanger system, provided that the phase separation leads to an increased apparent viscosity for the polymer solution flowing through the heat exchangers. Such increases in apparent viscosity can be modeled off-line for a given polymer solution under a given set of conditions using a thermodynamic model and data collected using a multi-pass rheometer (MPR).

The embodiments discussed above are not meant to be limiting. Any deliberate changes to the thermo physical state of a polymer solution within a heat exchanger that provide an increased apparent viscosity are contemplated by the current invention. The term "thermodynamic state" is meant to indicate the position of a given polymer solution in a vapor-liquid-liquid phase diagram. By the phrase "changes in the thermodynamic", it is meant that changes can be made to pressure, temperature and polymer solution composition, provided that such changes are sufficient in magnitude to induce the formation of sufficient amounts second liquid phase, such that the apparent viscosity of a two phase liquid-liquid system, as measured by use of an MPR, will be higher than the apparent viscosity of a single phase polymer system.

Further details of the invention are provided in the following non-limiting example.

EXAMPLES

Figure 5:
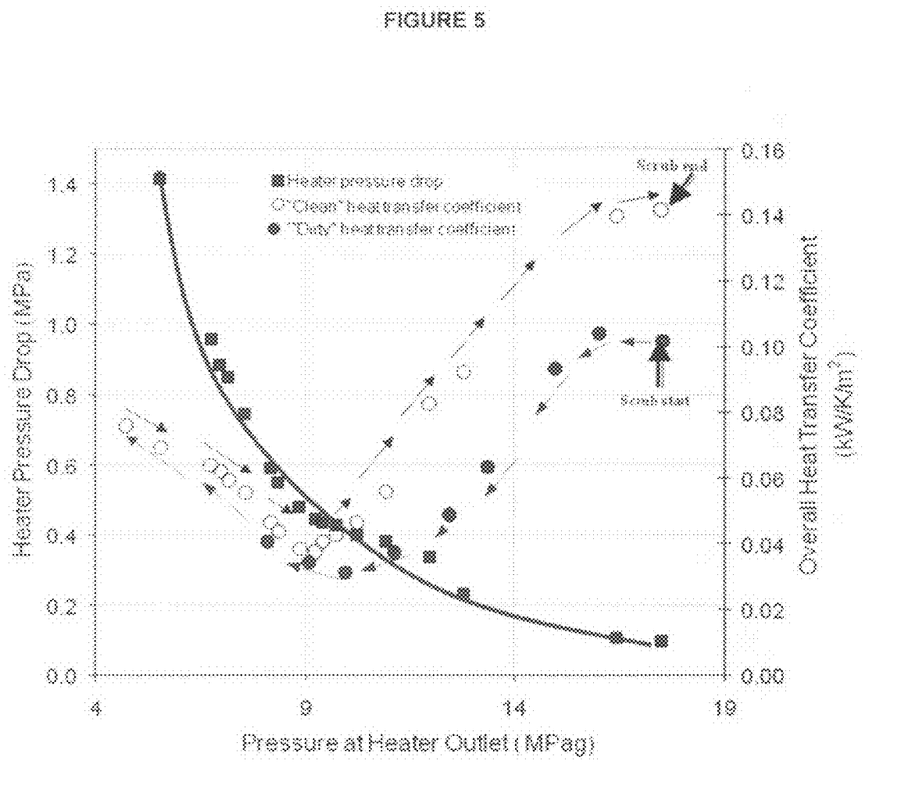
FIG. 5 is a diagram showing the relationship between a transient pressure drop across a heat exchanger and the heat exchanger coefficient, U. The pressure drop is induced by reducing the back end pressure of a heat exchanger.

An example of the heat exchanger cleaning method of the current invention is illustrated in FIG. 5, which displays two plots. The data is for a single shell and tube heat exchanger, which is used to heat a representative effluent polymer solution containing approximately 15 wt % polymer in a hydrocarbon solvent containing a residual amount of ethylene. The flow rate of polymer solution through the heat exchanger was approximately 450 kg/h. The first plot, with ordinate values on the left hand side, shows changes in the pressure drop, $(P_{IN}-P_{OUT})_{TRANSIENT}$ across a heat exchanger due to deliberate changes in the pressure downstream of the heat exchanger, $P_{OUT}$ which is plotted on the abscissa. The second plot displays the overall heat transfer coefficient, U, (which is a measure of the heat transfer efficiency of the heat exchanger) also plotted as a function of the heater downstream pressure, $P_{OUT}$. To clean the heat exchanger, $P_{OUT}$ was deliberately decreased from about 17 MPag to about 6 MPag. The lower, $P_{OUT}$ pressure of about 6 MPag was maintained for a few hours, and then allowed to increase back to the initial $P_{OUT}$ pressure of about 17 MPag. Deliberate control of the $P_{OUT}$ and hence the resulting pressure drop, $(P_{IN}-P_{OUT})_{TRANSIENT}$ was achieved using a pressure let down valve downstream of the heat exchanger. At the start of the cleaning operation, the downstream pressure was 17 MPag, and the heat transfer coefficient was slightly above 0.1 kW/K/m². As the downstream pressure, POUT was reduced from 17 MPag to 6 MPag, the transient pressure drop, $(P_{IN}-P_{OUT})_{TRANSIENT}$ increased from about 0.1 MPa to 1.4 MPa, while the heat transfer coefficient, U, initially decreased, and then increased to a value of about 0.07 kW/K/m². Upon returning to the original outlet pressure of about 17 MPag, the heat transfer coefficient had increased from a starting value of 0.1 kW/K/m² to a final value of 0.14 kW/K/m². The data in FIG. 5 show that the process of the current invention increased the heat transfer coefficient, U by about 0.04 kW/K/m². Hence, the cleaning operation, in which a transient pressure drop was deliberately induced across the heat exchanger led to an increase in the efficiency of the heat exchanger, which is consistent which the removal of foulant material from the tube side walls of the heat exchanger.

What is claimed is:

1. A high temperature solution polymerization process comprising:
   a) polymerizing one or more olefins in a solvent within a reactor system to produce a single-phase polymer solution;
   b) quenching the polymerization reaction by adding a catalyst deactivator to the polymer solution effluent from said reactor system;
   c) feeding the polymer solution through one or more heat exchangers to increase the temperature of the polymer solution; and
   d) feeding the polymer solution effluent from said one or more heat exchangers to a devolatilization system; the improvement of which comprises a method for the on-line cleaning of said one or more heat exchangers, wherein said method comprises periodically reducing the pressure at the back end of one or more of said heat exchangers using a pressure control valve downstream of one or more of said heat exchangers, wherein reducing the pressure at the back end of one or more of said heat exchangers deliberately creates a positive pressure differential across said one or more heat exchangers and wherein the pressure at the back end of one or more of said heat exchangers is reduced by an amount sufficient to induce the single phase polymer solution to undergo phase separation within said one or more heat exchangers to give a two phase liquid-liquid polymer solution.

2. The process according to claim 1, wherein the apparent viscosity of said two phase liquid-liquid polymer solution is higher than the apparent viscosity of said single phase polymer solution.

3. The process according to claim 2, wherein said positive pressure differential across said one or more heat exchangers is equal to or greater than the steady state pressure gradient across said one or more heat exchangers.

4. The process according to claim 3, wherein the polymerization process comprises homopolymerizing or copolymerizing one or more olefins selected from the group comprising ethylene, propylene, styrene, and diene monomers.

5. The process according to claim 4, wherein the ethylene wt % in the polymer solution is increased relative to the ethylene wt % in the polymer solution before the liquid-liquid phase separation is induced.

6. The process according to claim 4, wherein the polymer wt % in the polymer solution is decreased to an amount of from not less than 0.1 wt % to an amount that is less than the polymer wt % in the polymer solution before the liquid-liquid phase separation is induced.

7. The process according to claim 4, wherein the mass flow rate of the polymer solution flowing through said one or more heat exchangers is increased relative to the mass flow rate of the polymer solution flowing through said one or more heat exchangers before the liquid-liquid phase separation is induced.

8. A high temperature solution polymerization process comprising:
   a) homo-polymerizing ethylene or co-polymerizing ethylene with one or more alpha-olefins in a solvent within a stirred tank reactor system to produce a single phase polymer solution;
   b) quenching the polymerization reaction by adding a catalyst deactivator to the polymer solution effluent from said stirred tank reactor system;
   c) feeding the polymer solution through one or more heat exchangers to increase the temperature of the polymer solution; and
   d) feeding the polymer solution effluent from said one or more heat exchangers to a devolatilization system; the improvement of which comprises a method for the on-line cleaning of said one or more heat exchangers, wherein said method comprises periodically creating a positive pressure differential across said one or more heat exchangers by deliberately inducing said single phase polymer solution to undergo phase separation to give a two phase liquid-liquid polymer solution within said one or more heat exchangers, wherein the apparent viscosity of said two phase liquid-liquid polymer solution is higher than the apparent viscosity of said single phase polymer solution.

9. The process according to claim 8, wherein the pressure at the back end of one or more of said heat exchangers is reduced by an amount sufficient to induce the single phase polymer solution to undergo liquid-liquid phase separation within said one or more heat exchangers.

10. The process according to claim 9, wherein said positive pressure differential is controlled using a pressure control valve that is downstream of one or more of said heat exchangers.

11. The process according to claim 10, wherein said positive pressure differential across said one or more heat exchangers is equal to or greater than the steady state pressure gradient across said one or more heat exchangers.

12. The process according to claim 11, wherein the ethylene wt % in the polymer solution is increased relative to the ethylene wt % of the polymer solution before the liquid-liquid phase separation is induced.

13. The process according to claim 11, wherein the polymer wt % in the polymer solution is decreased to an amount of from not less than 0.1 wt % to an amount that is less than the polymer wt % in the polymer solution before the liquid-liquid phase separation is induced.

14. The process according to claim 11, wherein the mass flow rate of the polymer solution flowing through said one or more heat exchangers is increased relative to the mass flow rate of the polymer solution flowing through said one or more heat exchangers before the liquid-liquid phase separation is induced.

15. The process according to claim 11, wherein the mass flow rate of the polymer solution flowing through said one or more heat exchangers is at least 180 tons/h.

16. The process according to claim 15, wherein the temperature of the polymer solution effluent from said stirred tank reactor system is at least 180° C. and is heated to more than 210° C. in said one or more heat exchangers.

17. The process according to claim 16, wherein the positive pressure differential is maintained for at least 2 hrs.

18. A high temperature solution polymerization process comprising:
   a) polymerizing one or more olefins in a solvent within a reactor system to produce a single phase polymer solution;
   b) quenching the polymerization reaction by adding a catalyst deactivator to the polymer solution effluent from said reactor system;
   c) feeding the polymer solution through one or more heat exchangers to increase the temperature of the polymer solution; and
   d) feeding the polymer solution effluent from said one or more heat exchangers to a devolatilization system; the improvement of which comprises a method for the on-line cleaning of said one or more heat exchangers, wherein said method comprises periodically creating a positive pressure differential across said one or more heat exchangers by deliberately changing the thermodynamic state of the polymer solution within said one or more heat exchangers so that the polymer solution undergoes a liquid-liquid phase separation within said one or more heat exchangers to give a two phase liquid-liquid polymer solution, provided that the apparent viscosity of said two phase liquid-liquid polymer solution is higher than the apparent viscosity of said single phase polymer solution.

19. The process according to claim 18, wherein changing the thermodynamic state of the polymer solution involves one or more of the steps comprising:
   i) reducing the pressure at the back end of one or more of said heat exchangers;
   ii) increasing the temperature of the polymer solution;
   iii) increasing the ethylene concentration in the polymer solution;
   iv) decreasing the polymer concentration in the polymer solution; and
   v) adding a low molecular weight hydrocarbon or inert gas to the polymer solution.

* * * * *